Jan. 13, 1970  G. STOCK  3,489,196
SCREW LOCKING DEVICE

Filed May 31, 1968  2 Sheets-Sheet 1

Jan. 13, 1970  G. STOCK  3,489,196
SCREW LOCKING DEVICE
Filed May 31, 1968  2 Sheets-Sheet 2
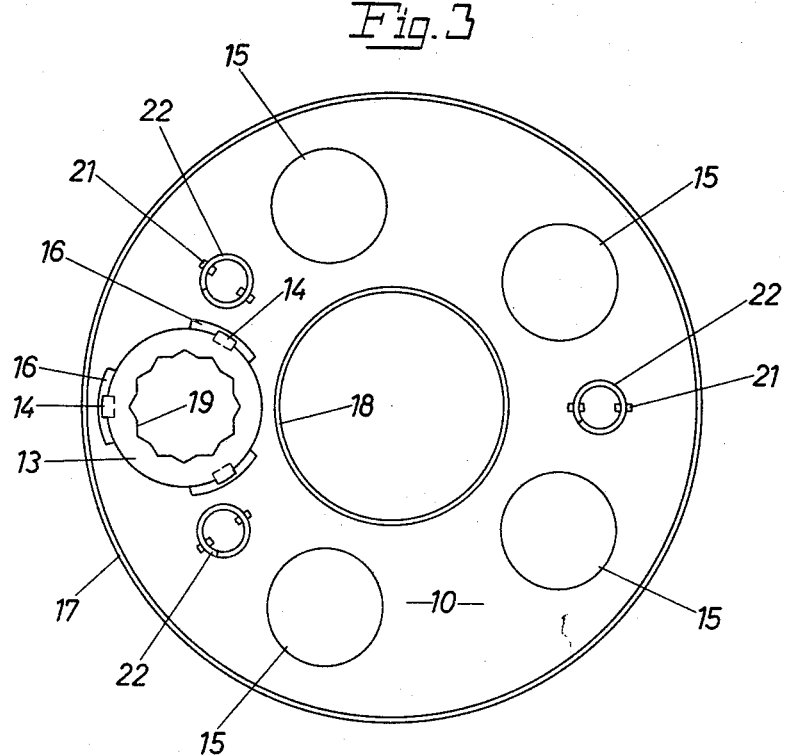
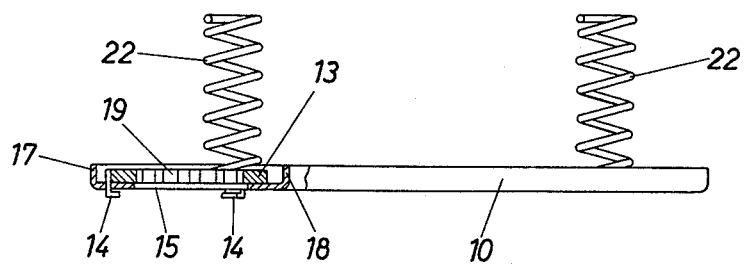
INVENTOR.
Günter Stock
BY
[signature] attorney

United States Patent Office 3,489,196
Patented Jan. 13, 1970

3,489,196
SCREW LOCKING DEVICE
Gunter Stock, Hackhauser Strasse 20,
Solingen-Ohligs, Germany
Filed May 31, 1968, Ser. No. 733,638
Claims priority, application Germany, June 2, 1967,
St 21,352, St 21,353
Int. Cl. F16b *39/02;* B60b *27/00*
U.S. Cl. 151—54                                    6 Claims

ABSTRACT OF THE DISCLOSURE

A screw locking device in form of a sheet metal part of strip- or ring-shape having at least one opening corresponding with the profile of a screw head and a screw nut, respectively, and being lockable relative to a screw which comprises a ring insert rotatable to a limited extent in the sheet metal part for limiting the screw. The ring insert has an opening corresponding with the profile of the screw and the nut, respectively.

---

The present invention relates to a screw locking device, in general, and to a device effective against automatic release of a screw bolt or a screw nut, in particular, for the wheel bolts or wheel nuts of automotive vehicles, in particular, and essentially a screw locking device of such type, which is formed in form of a strip-like or ring-like sheet metal part, which contains one or a plurality of openings corresponding with the profile of the screw head or the screw nut and which can be secured in relation to the screws.

Wheels for automotive vehicles are secured, as is known, by means of screws or nuts to their axles. Conically formed faces on the screws and the nuts, respectively, engage thereby on the screws and the nuts, respectively, and on the wheel relative to each other. The friction effect created during tightening of the screws and of the nuts, respectively, between these faces should prevent a non-intended release of the wheel. The fast changing forces effective on the wheel and thereby upon the screw connection sharing the movement of the vehicle can, however, cause the release of the screws or the nuts, respectively, without possibility that this can be observed by the driver and the passengers, respectively. Accidents, which have this cause, are generally known. One has found for this reason already screw locking devices which comprise a sheet metal part, in which in proper position circular openings for the screw-head or nuts are recessed for the screw-head or nuts having hexagonal faces, the diameter of which is, however, smaller than the circle of the points of the hexagon. These openings are pressed over the screw heads and nut, respectively, so that the openings are widened and adjusted to the hexagon. An appreciable drawback of such safety lock devices is the difficult release possibility. Also, a multiple use of the screw locking device is not possible.

It is, therefore, one object of the present invention to provide a screw locking device, wherein a simple, reliably operating handy device for locking of the securing screws and nuts, respectively, of wheels of automotive vehicles is created against non-intended release, which can be easily applied and again released on the hexagonal heads of the screws and nuts, respectively.

It is another object of the present invention to provide a screw locking device, wherein the sheet metal part for the locking of the screw and of each screw, respectively, has a ring insert, rotatable to a limited extent, the opening of the ring insert corresponding with the opening of the profile.

It is still another object of the present invention to provide a screw locking device, wherein the sheet metal part for two or a plurality of screws disposed in one row is formed of two or more sheet metal strips containing the ring inserts, which consists of two or several parts displaceable relative to each other in longitudinal direction. It is of advantage to make the inserts rotatable within the range of 60° in case of the hexagon, or 30° in case of a twelve angle member. At the end of these rotary movements, the inserts abut on rigid abutments.

It is still another object of the present invention to provide a screw locking device wherein the sheet metal part is designed with suitable resilient holding members for its securing on the machine or apparatus part receiving the screws.

Accordingly, in case of a screw lock on wheels of automotive vehicles with hub caps, it is of advantage that the sheet metal part carries laterally projecting springs which support themselves on the mounted wheel on the inner face of the hub cap.

An advantage in case of use of the apparatus in accordance with the present invention resides, in the first place, in the fact that also such wheel securings and nuts, respectively, cannot turn loose, which securing means have been tightened insufficiently during a wheel change, for instance, at a gas station by non-skilled personnel. This mounting error occurs particularly easily if a tire damage has occurred while on a trip, and suddenly a wheel change is required, without possibility that a gas station can be found.

A further advantage of the present invention resides in the fact that the application of the locking device is not dependent upon particular securing screws and nuts, respectively, or special keys. Rather, all wrenches or the like used before can be retained, as well as the securing and loosening of the wheels can be performed in the generally known manner. The safety device, in accordance with the present invention, is mounted without difficulty after the securing of a wheel, on the screw heads and nuts, respectively. Thereafter, the hub caps are secured, and thereby the locking devices are pressed thereon by springs, one end of which is secured to the sheet metal strip of the device and the other end engages the hub cap.

With these and other objects in view, which will become apparent in the following detailed description, the present invention will be clearly understood in connection with the accompanying drawings, in which:

FIG. 3 is a top plan view of a ring-shaped device for locking of all securing screws and nuts, respectively, on the wheel of an automotive vehicle; and FIG. 4 is a front elevation of the device shown in FIG. 3, partly in section.

Figure 1:
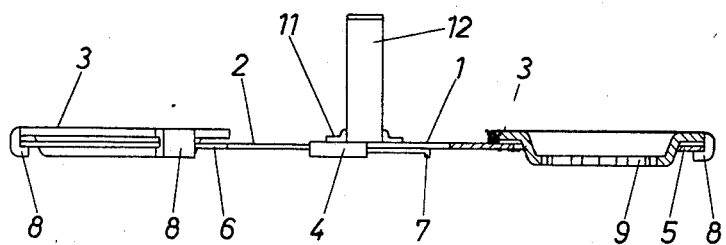
FIGURE 1 is an apparatus for locking of two securing screws partly in elevation and partly in section.
Figure 2:
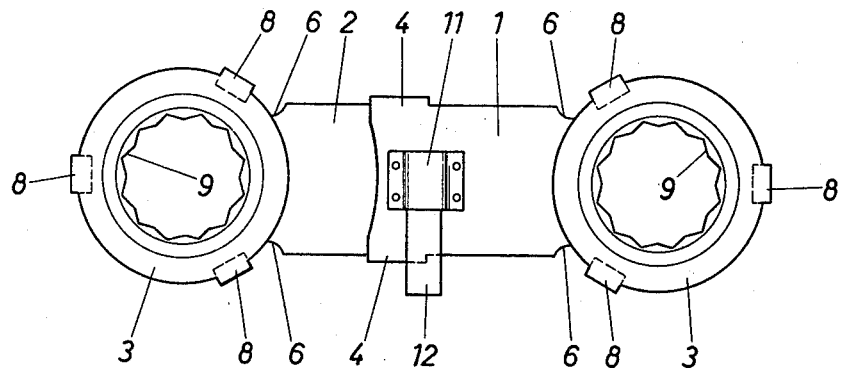
FIG. 2 is a top plan view of the device shown in FIG. 1.

Referring now to the drawings, and in particular to FIGS. 1 and 2, the device comprises sheet metal strips 1 and 2 having each an annularly shaped end 5, in which an insert 3 with an inner twelve-angle formation 9 is provided and a spring 12 which is retained by means of a lug 11. The sheet metal strip 1 grips about the sheet metal strip 2 with two bent portions 4, such that the sheet metal strip 2 is displaceable relative to the sheet metal strip 1. The displaceability is limited by an abutment 7 at the end of the sheet metal strip 2. The inserts 3 are secured with three bent-over portions 8 on the annular parts 5, such that a rotary movement for about 30° is possible. This rotary movement is limited by abutments 6.

Prior to the mounting of the safety locking device, designed in accordance with the present invention and disclosed in FIGS. 1 and 2, on the locking screws and nuts, respectively, of a wheel of an automotive vehicle, the sheet metal strips 1 and 2 are displaced as far from each other that the screw head and nut distance is achieved. Furthermore, the two ring-shaped inserts 3 are rotated so far that the twelve angle member fits on the prevailing screw head and nut, respectively. When the device is mounted, the blade spring 12 is moved below the lug 11, so that upon mounting of the second safety device and mounting of the hub cap (not shown) the devices are pressed towards the wheel by means of the spring 12.

Referring now again to the drawings, and in particular to FIGS. 3 and 4, the screw locking device shown therein comprises for each wheel an annular sheet metal part 10 and as many annular inserts 13 as screw heads and nuts, respectively, are present on the wheel, as well as three springs 22. Thus, the selection of one ring for a predetermined wheel is made accordingly.

In FIG. 3, merely by example, a plurality of five equally divided bores 15 is provided in the sheet metal ring 10. Coaxially to each bore are disposed equal annular inserts 13, which grip with three bent over lugs 14 through concentric slots 16, so that they are rotatable for about 30°. The inserts 13 are equipped inwardly with a twelve-angle formation 19 which fits on the prevailing screw heads and nuts, respectively. The outer edge 17 as well as the inner edge 18 of the sheet metal ring 10 is bent over towards the inserts 13. The springs 22 are secured in bores which are formed by pressings-out 21. Instead of the shown helical springs 22 also blade springs can be used. In some wheels, further small bores are provided in the bore circle of the securing screws. In these wheels, the securing of the sheet metal part 10 can take place also with other formed springs, which enter these small bores.

Prior to the mounting of the safety device, only the inserts 13 are to be rotated in the sheet metal part 10, such that the twelve-edge formation 19 can slide on the not shown screw heads and nuts, respectively. Due to the mounting of the hub wheel, the sheet metal ring is pressed by means of the spring 22 against the wheel, so that an automatic loosening of the screws and nuts is not possible.

I claim:

1. A screw locking device in form of a sheet metal part of strip- or ring-shape having at least one opening corresponding with the profile of a screw head and of a screw nut, respectively, and being lockable relative to a screw, comprising a ring insert rotatable to a limited extent in said sheet metal part for limiting said screw, said ring insert having an opening corresponding with the profile of said screw and said nut, respectively, said ring insert having retaining means bent over the edge of said sheet metal part, said retaining means providing rotation limiting means, and spring biasing means adapted to press said sheet metal part towards a wheel.

2. The screw locking device, as set forth in claim 1, comprising at least two screws disposed in a row, and said sheet metal strip containing said ring insert includes at least two parts adjustable relative to each other in longitudinal direction.

3. The screw locking device, as set forth in claim 1, wherein said spring biasing means comprise resilient holding members adapted for locking said sheet metal part of a machine part receiving said screw.

4. The screw locking device, as set forth in claim 1, which includes hub caps for wheels of automotive vehicles, and having an inner face, and said spring biasing means comprise laterally projecting springs, and said springs support themselves on said inner face of said hub cap of the mounted wheel.

5. The screw locking device, as set forth in claim 1, wherein said spring biasing means comprises springs projecting out of the plane of said sheet metal part, and pressing axially the latter against said screw heads and said screw nuts, respectively.

6. The screw locking device, as set forth in claim 1, wherein said sheet metal part defines concentric slots surrounding said ring insert and receiving in said slots said bent-over retaining means.

References Cited

UNITED STATES PATENTS

| | | | |
|---|---|---|---|
| 579,456 | 3/1897 | Rutherford | 151—59 |
| 2,104,800 | 1/1938 | Grandy et al. | 301—108 |
| 2,359,555 | 10/1944 | Herreshoff et al. | 151—52 |
| 2,394,666 | 2/1946 | Cloedy et al. | 151—50 |
| 2,626,837 | 1/1953 | Wilson et al. | 151—44 |
| 2,758,628 | 8/1956 | Rice | 151—54 |

FOREIGN PATENTS

| | | |
|---|---|---|
| 942,489 | 9/1948 | France. |
| 672,705 | 3/1939 | Germany. |
| 26,383 | 10/1915 | Norway. |

MARION PARSONS, JR., Primary Examiner

U.S. Cl. X.R.

301—9